United States Patent [19]

Kronogård

[11] 4,185,710
[45] Jan. 29, 1980

[54] VEHICLE HAVING AT LEAST TWO DRIVEN AXLES

[76] Inventor: Sven-Olof Kronogård, Karstorpsvagen 31, Lomma, Sweden, 23400

[21] Appl. No.: 842,900

[22] Filed: Oct. 17, 1977

[30] Foreign Application Priority Data

Oct. 21, 1976 [SE] Sweden ............................. 7611668

[51] Int. Cl.² ............................................. B62D 59/04
[52] U.S. Cl. .................................. 180/14 A; 60/717; 60/719; 180/14 D; 180/243; 180/65 A
[58] Field of Search ................ 180/14 A, 14 D, 65 A, 180/54 C, 44 M; 60/335, 340, 346, 348, 716, 717, 718, 719

[56] References Cited

U.S. PATENT DOCUMENTS

| 871,098 | 11/1907 | Albrecht | 180/44 M |
|---|---|---|---|
| 2,754,015 | 7/1956 | Lee | 180/43 R |
| 3,090,458 | 5/1963 | Wolf | 180/14 A |
| 3,130,805 | 4/1964 | Carter et al. | 180/14 D |
| 3,262,513 | 7/1966 | Henriksson et al. | 180/65 A |
| 3,421,596 | 1/1969 | Christenson et al. | 180/44 E |
| 3,498,057 | 3/1970 | Kronogård et al. | 180/66 A |
| 3,584,698 | 6/1971 | Larson | 180/14 A |
| 3,612,202 | 10/1971 | Moon, Jr. | 180/14 A |
| 3,860,081 | 1/1975 | Moll et al. | 180/14 A |
| 3,874,470 | 4/1975 | Greene | 180/14 D |
| 3,889,770 | 6/1975 | Herbert | 180/14 R |
| 3,913,697 | 10/1975 | Greene | 180/14 A |
| 3,979,915 | 9/1976 | Kronogård | 180/54 C |

FOREIGN PATENT DOCUMENTS

| 2153961 | 5/1973 | Fed. Rep. of Germany . |
| 2507006 | 9/1976 | Fed. Rep. of Germany . |
| 7501425 | 8/1975 | France . |

Primary Examiner—Joseph F. Peters, Jr.
Assistant Examiner—Donn McGiehan
Attorney, Agent, or Firm—Cantor and Singer

[57] ABSTRACT

A vehicle having at least two driven axles is powered by a gas turbine plant having two separate take-off shafts. One of these is connected to a first driven axle by a mechanical gearing, while the other take-off shaft is connected to a second driven axle by way of a transmission including a non-mechanical link.

The non-mechanical link may include provision for electric power transfer and the transmission can be equipped with a current collector adapted to occasionally cooperate with a fixed electric main for transferring electric power into the transmission, to be used instead of, or together with the current generated by the gas turbine plant.

1 Claim, 3 Drawing Figures

VEHICLE HAVING AT LEAST TWO DRIVEN AXLES

BACKGROUND OF THE INVENTION

With many vehicles it is desirable to perform the driving at two or more axles. When transporting heavy loads, especially by means of articulated vehicles, it is difficult to arrange a mechanical power transfer to axles located in a part of the vehicle, remote from the part carrying the prime mover.

Pure electrical and pure hydraulic transmissions have been proposed, but such plants will, when heavy power is demanded, become inefficient, or heavy, expensive and complicated.

SUMMARY OF THE INVENTION

According to the present invention the prime mover of the vehicle is a gas turbine having at least two turbine rotors mounted upon separate shafts, being interconnected by a variable transmission. One of said turbine shafts is, by way of a mechanical gearing, connected to a first of said axles, while a second of said turbine shafts, by way of a transmission including a non-mechanical link, is connected to a second of said axles.

A significant portion of the power output may then be transferred by mechanical transfer means to an adjacent driving axle, whereas driving axles located remotely with respect to the prime mover, or carrying a part of the vehicle, being articulatedly connected to the part carrying the prime mover, are supplied with energy, for instance as electric current or pressure fluid. The expression driving axle is here used as a collective definition, irrespective of the final, ground engaging means being wheels, tracks or the like.

The gas turbine has two separate rotors, each rotor having its own power take-off shaft. A variable transmission interconnects the shafts and at least one of the rotors may be provided with adjustable inlet guide means, so as to make possible a rapid and efficient distribution of the total power output between the two take-off shafts, as required by the occasional load upon the plant.

Special consideration must be given to such vehicles, as are used in mines or sub-terranean tunnels for transportation of ore or excavated material, and where it is desirable, when the vehicle is used underground, to use a prime mover, which does not emit exhaust gas, or when it is necessary to reduce the output in order to reduce the amount of the exhaust gas. A vehicle according to the invention, and equipped with electric transmission means at one or more axles can be provided with current collector means cooperating with a fixed live main within the mine or tunnel, so the vehicle may be operated solely by electric power. It is evident that a power plant according to the invention offers special advantages as it, for instance, is possible, when carrying a heavy load out of a mine, to let the prime mover direct its full power output by way of the mechanical transmission to the first axle, while electric motors at the secondary shaft(s) are fed by current from the fixed live mains.

BRIEF DESCRIPTION OF SOME PREFERRED EMBODIMENTS

Figure 1:
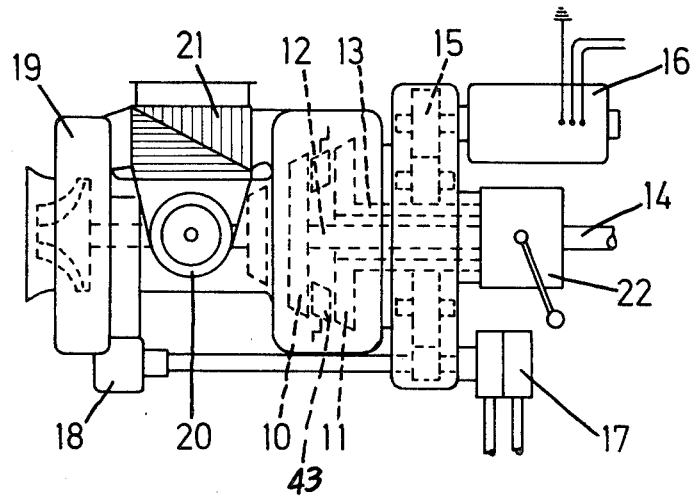
FIG. 1 schematically shows a gas turbine, suitable for propulsion of a vehicle of the type actual here.

The prime mover shown in FIG. 1 is a gas turbine plant including the components making it fit for use with vehicles of the types actual here, i.e. it has at least two rotors 10 and 11, operating upon shafts 12 and 13, respectively, the latter being tubular and enclosing the first mentioned one. Shaft 12 is, in the first hand, intended to drive an output shaft 14, which, by way of a transmission (not shown), is connected to a first driving axle of the vehicle.

The other turbine shaft 13 will, in the first hand drive an electric generator 16, a hydraulic pump 17, as well as the auxiliaries 18 of the plant, by way of a second transmission 15.

The plant further includes a compressor 19, which in any suitable manner, not shown, in the drawing is driven by either of rotors 10 or 11, or by some further rotor, not shown. The compressed air is conducted from the compressor to a combuster 20 by way of an air preheater 21, through which the exhaust from the turbine rotors also passes.

The two turbine rotor shafts 12 and 13 are interconnected by means of an infinitely variable third transmission 22. The rotors may alternatively, or in addition to an infinitely variable third transmission, be provided with adjustable inlet guide vanes 43, so the available power output, at will, may be distributed between the primary output shaft 14 and the apparatus driven by second transmission 15.

Figure 2:
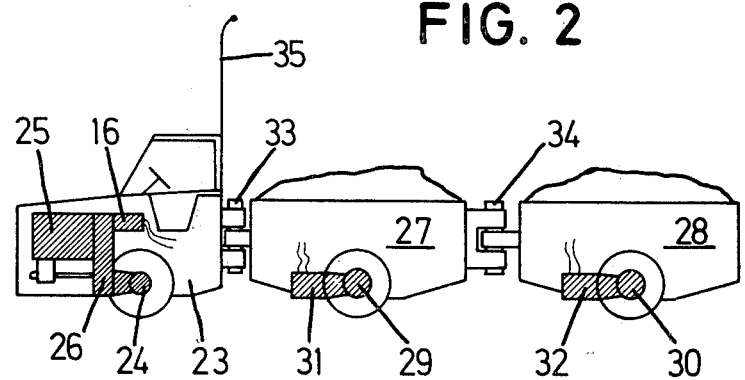
FIG. 2 shows an articulated truck equipped with a power plant according to the invention.

FIG. 2 shows an articulated truck provided with a power plant according to the invention. The truck includes a first portion 23 having one driving axle 24 and carrying a prime mover 25 of basically the same type as described above in connection with FIG. 1, as well as the necessary steering and governing equipment. An electric generator is also here denoted by 16. A transmission, preferably of the mechanical type, between prime mover 25 and the first driving axle 24, is denoted by 26.

The truck further has two load carrying portions 27 and 28, being formed as open containers adapted for the transportation of bulk goods, such as ore. Each of these portions is, in this embodiment, carried by a wheeled axle 29 and 30, respectively, being equipped for driving by means of electric motors 31 and 32, respectively. These motors are normally fed by current from generator 16 driven by prime mover 25.

The portions of the truck are interconnected by articulated joints, 33, 34. The electric cables transferring the current past these joints are not shown, but may be arranged in any suitable manner.

The hydraulic pump 17, driven by the prime mover, may supply jacks of well known type located at cargo carrying portions 27 and 28 with pressure fluid, so the containers may be dumped in a conventional way. Pressure fluid may also be supplied to loading equipment (not shown), for instance of the scraper type.

In order to make possible underground operation of the truck, without the prime mover 25 being used, or for aiding the same, when the fully loaded truck is driven up a steep gradient, for instance in an open mine, the truck is provided with current collector means 35 adapted for cooperation with a fixed electric main. In this manner the truck may be driven solely by means of electric motors 31 and 32, or alternatively with prime mover 25 transferring all torque to axle 24, while axles 29 and 30 are driven by electric current supplied from the main. Generator 16 may be of a type adapted, alternatively to operate as a motor, and on such occasion it is possible to obtain a drive of axle 24, also, with power supplied from the main.

Figure 3:
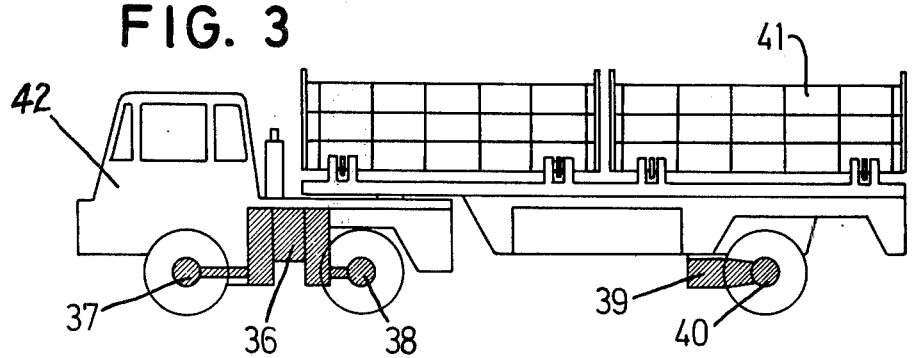
FIG. 3 shows a so called side dump truck having a somewhat modified power plant.

FIG. 3 shows the invention as used in a modified embodiment at a side dumping truck. This includes a first portion 42 supporting the prime mover 36 and the governing equipment, and is provided with ground engaging wheels at two driving axles 37 and 38, which on this occasion both are driven by mechanical transmissions from prime mover 36.

This is also here a gas turbine of the type described in connection with FIG. 1, but the electric generator 16 and the auxiliary hydraulic pump 18 are substituted by a big hydraulic pump, delivering pressure fluid to hydraulic motors 39 driving at axle 40, at a load carrying portion 41. This is pivotably connected to the first portion, and is provided with jacks (not shown) for tilting the cargo containers.

The details of the invention may of course further be varied and combined in many different ways within the scope of the appended claims, and the embodiments shown must be regarded as examples only.

The invention may thus be used with many other vehicles, such as forestry processing machines, earth moving machines, harvesting combines and for military purposes. The system may be useful for driving busses in mixed road and city traffic, where electric operation may be used on special bus roads, the busses possibly being interconnected to small train sets.

What I claim is:

1. A vehicle having at least first and second driving axles supported by ground engaging members and comprising:
   (A) a prime mover including a gas turbine having at least two turbine rotors mounted upon separate first and second shafts and supplied with motive gas from a common gas generating portion including at least one combustor,
   (B) a mechanical gearing means connecting said first turbine shaft with said first driving axle,
   (C) a transmission including a non-mechanical link connecting said second turbine shaft with said second driving axle,
   (D) said non-mechanical link including an electric transfer link and further is provided with means for collecting electric current from a fixed stationary main and to transfer said current into said electric link,
   (E) an infinitely variable further transmission interconnecting said mechanical gearing means and said first mentioned transmission by way of said first and second rotor shafts,
   (F) adjustable guide vanes at the inlet of at least one of said turbine rotors for distribution of the total load between said first and said second turbine shafts, and
   (G) air preheater means for recirculating heat in the exhaust from the second turbine rotor by way of the combustor.

* * * * *